US008931529B2

(12) United States Patent
Fregeau

(10) Patent No.: US 8,931,529 B2
(45) Date of Patent: Jan. 13, 2015

(54) SUPPORT STANDS FOR MOVABLE SUPPORT OF POWER TOOLS

(76) Inventor: Keivn John Fregeau, Keewatin (CA)

(*) Notice: Subject to any disclaimer, the term of this patent is extended or adjusted under 35 U.S.C. 154(b) by 749 days.

(21) Appl. No.: 13/216,337

(22) Filed: Aug. 24, 2011

(65) Prior Publication Data

US 2013/0049276 A1 Feb. 28, 2013

(51) Int. Cl.

| | |
|---|---|
| ***B25H 1/00*** | (2006.01) |
| ***B23Q 1/64*** | (2006.01) |
| ***B25H 1/06*** | (2006.01) |
| ***B25H 1/04*** | (2006.01) |
| ***B25F 5/02*** | (2006.01) |

(52) U.S. Cl.

CPC .. *B25H 1/06* (2013.01); *B25H 1/04* (2013.01); *B25F 5/026* (2013.01)

USPC .......................... 144/286.1; 144/286.5; 269/56

(58) Field of Classification Search

CPC ............ B25H 1/00; B25F 5/00; B23D 47/00; B27B 25/00

USPC ......... 269/56, 290, 17, 291, 71, 55, 136–138; 248/674; 144/286.1, 286.5

See application file for complete search history.

(56) References Cited

U.S. PATENT DOCUMENTS

| | | | | |
|---|---|---|---|---|
| 3,988,014 | A * | 10/1976 | Worden | 269/71 |
| 4,964,449 | A * | 10/1990 | Conners | 269/290 |
| 4,974,651 | A * | 12/1990 | Carmon et al. | 144/286.1 |
| 5,193,598 | A | 3/1993 | Estrem | |
| 5,592,981 | A | 1/1997 | Derecktor | |
| 5,836,365 | A | 11/1998 | Derecktor | |
| 6,745,804 | B2 | 6/2004 | Welsh et al. | |
| 7,458,403 | B2 | 12/2008 | Radermacher | |
| 2010/0107838 | A1* | 5/2010 | Berg et al. | 83/54 |

* cited by examiner

*Primary Examiner* — Lee D Wilson
*Assistant Examiner* — Seahee Yoon
(74) *Attorney, Agent, or Firm* — Kyle R. Satterthwaite; Ryan W. Dupuis; Ade & Company Inc

(57) ABSTRACT

A support stand for movable support of a power tool features the use of rollers to support a tool mount along an elongated track. The track features a cover arrangement disposed over the surfaces on which the rollers move so as to avoid sawdust or other debris from building up on the track and interfering with smooth rolling motion of the tool mount. The stand is assembled in a working position by attaching two stand sections end to end to form the track, and is also configured for arrangement into a collapsed condition in which the stand sections stack one atop the other for space efficient storage and convenient transport.

20 Claims, 6 Drawing Sheets

SUPPORT STANDS FOR MOVABLE SUPPORT OF POWER TOOLS

FIELD OF THE INVENTION

The present invention relates generally to support stands for carrying both a power tool mounted thereon and a workpiece to be operated on by the tool, and more particularly to stands of this type in which the tool is repositionable on the stand by displacement of the tool support of the stand along a track thereof.

BACKGROUND OF THE INVENTION

It is well known to provide a work bench or stand featuring a track that is elevated off the ground by support legs and movably carries tool mount arrangement on which a saw or other power tool is mountable so that the tool position on the bench or stand can be changed by displacing the tool mount arrangement back and forth along the track. Examples of such prior art include those shown in U.S. Pat. Nos. 5,836,365 and 5,592,981 of Derecktor; U.S. Pat. No. 7,458,403 of Radermacher, U.S. Pat. No. 6,745,804 of Welsh et al., U.S. Pat. No. 5,193,598 of Estrem and U.S. Pat. No. 4,964,449 of Conners. Of these, most employ a sliding interface between the track and the tool mount, while Conners employs wheels that roll within a pair of upward opening channels running the length of the stand.

A potential shortcoming with the prior art designs referenced above is that the areas of track on which the tool mount slides or rolls are exposed from above, and thus susceptible to sawdust or material freed from the workpiece by operation of the tool. Such material at the moving interface between the track and the tool mount slide-bracket or rollers can interfere with smooth movement of the tool mount, and any other features displaceable along the track, between desired useful positions.

Accordingly, there remains room for improvement in the area of support stands or workbenches for movable support of a tool mount.

SUMMARY OF THE INVENTION

According to a first aspect of the invention there is provided a support stand for rolling support of a power tool, the support stand comprising:

an elongated track comprising at least one rail;

support legs coupled to the track at spaced apart locations therealong for depending downward from the track to a ground surface to support the track at an elevation thereabove;

a movable tool mount comprising:

- a tool support positioned above the track and arranged for mounting of the power tool thereon; and
- rollers positioned below the tool support and carrying the movable tool mount on the track for rolling displacement of the movable tool mount therealong;

wherein each rail comprises at least one upward facing roller support surface on which at least one of the rollers rides along a length of said support surface, and a cover arrangement positioned above said at least one roller in a position spanning fully across each said support surface over the length thereof.

Preferably each rail comprises a channel member integrally defining the cover arrangement and each support surface of said rail.

Preferably said channel member closes fully around three of four sides of said channel member.

Preferably each rail comprises a top wall closing over said at least one roller, two side walls depending down from said top wall on opposite sides of said at least one roller and at least one bottom wall extending from a respective one of the side walls toward the other side wall to define the at least one roller support surface.

Preferably said at least one bottom wall comprises two bottom walls extending toward one another from the side walls to define two roller support surfaces, each carrying one or more rollers thereon.

Preferably a connection between the tool support and each of the at least one roller of each rail extends into a space between the at least one support surface of said rail and the cover arrangement of said rail from below said at least one support surface.

Preferably the at least one rail comprises two parallel rail spaced apart from another in a width direction transverse to the length of the roller support surfaces, and a connection between the tool support and each of the at least one roller of each rail lies as least partially on an outer side of the rail opposite the other rail.

Preferably the movable tool mount comprises at least one carriage rotatably carrying at least one pair of the rollers.

Preferably the rollers of each carriage include rollers on opposite sides of thereof.

Preferably the rollers of each carriage include rollers carried on said carriage at spaced apart locations along the track.

Preferably there is provided at least one movable workpiece support each movably carried on the track for adjustment of a position of said movable workpiece support along said track.

Preferably each movable workpiece support is movable along the track by rolling support of said workpiece support on the same at least one roller support surface on which the movable tool mount is rollingly supported by the rollers.

Preferably said at least one movable workpiece support comprises two movable workpiece supports disposed on opposite sides of the movable tool support along the track.

Preferably each movable workpiece support comprises a movable upright unit movably carried on the track in a position projecting upwardly away therefrom, and a plurality of different workpiece engagement units separately deployable in working positions mounted on said movable upright to support a workpiece thereon.

Preferably one of the different workpiece engagement units comprises a roller unit arranged to rollingly engage the workpiece above the upright when deployed thereon.

Preferably each workpiece engagement unit is removably attachable to the movable upright, and is also removably attachable to a stationary upright mounted at a fixed location relative to a length of the elongated track.

Preferably each workpiece engagement unit is arranged for telescopic coupling with the upright to enable height adjustment of the movable workpiece support.

Preferably each upright comprises a hollow tube in which a base of the workpiece engagement unit is receivable and slidable.

Preferably each track comprises first and second track sections defined by first and second detachable stand sections arranged for selective attachment to one another in positions aligning inner ends of the track sections to complete said track, each stand section having a projecting feature thereon projecting upwardly away from the track by a distance exceeding heights by which the movable tool mount and movable workpiece supports carried on the first track section reach above said first tracks section such that detachment of the second stand section from the first stand section, lifting of the second stand section into a position residing over the first stand section in an inverted orientation, and lowering of the inverted second stand section toward the first stand section will seat the second stand section atop the projecting feature of the first stand section and seat the projecting feature of the second stand section on the first stand section to carry the second stand section on the first in a position overlying the movable tool mount and movable workpiece supports carried on the first stand section.

Preferably the projecting feature of each stand section comprises a respective additional workpiece support mounted adjacent an outer end said stand section opposite the inner end of the track section.

According to a second aspect of the invention there is provided a support stand for support of a power tool, the support stand comprising:

first and second stand sections that respectively comprise first and second track sections and are arranged for selective attachment to one another in a first position placing the first and second track sections end-to-end at inner ends of said track sections to define a track extending between outer ends of the two track sections;

support legs coupled separately to the first and second stand sections for depending from the stand sections, when attached to one another, downward to a ground surface to support the track at an elevation thereabove; and a movable tool mount comprising a track engaging portion arranged for movement back and forth along the track and a tool support portion carried on the track engaging portion on a side of the track opposite to that from which the legs depend when supporting the track above the ground surface, the tool support portion being arranged for mounting of the power tool thereon;

wherein each stand section has a projecting feature thereon that projects a distance away from the track on the side thereof opposite that from which the legs depend when supporting the track above the ground surface, the distance exceeding a height by which the movable tool mount reaches to said side of the track such that detachment of the second stand section from the first stand section, lifting of the second stand section into a position residing over the first stand section in an inverted orientation, and lowering of the inverted second stand section toward the first stand section will seat the second stand section atop the projecting feature of the first stand section and seat the projecting feature of the second stand section on the first stand section to carry the second stand section on the first in a position overlying the movable tool mount and movable workpiece supports carried on the first stand section.

Preferably the support legs comprise pivotal legs coupled to the stand sections for pivoting between stowed positions extending along the track sections and deployed positions projecting away therefrom, each pivotal leg on the first stand section is shorter than each pivotal leg on the second stand section, and a first distance from a first pivotal connection of each pivotal leg on the first stand section to the first track section is greater than a second distance from a second pivotal connection of each pivotal leg on the second stand section to the second track section so as to leave a larger gap between the first track section and each pivotal leg of the first stand section than between the second track section and each pivotal leg of the second stand section when the pivotal legs are in the stowed positions.

Preferably the support legs comprise outer end support legs coupled to the stand sections adjacent the outer ends of the track sections and an inner support leg coupled to a respective one of the stand sections adjacent the inner end of the track section thereof.

Preferably the inner support leg is adjustable in length.

Preferably the inner support leg is coupled to the second stand section and is the only inner support leg of the support stand.

BRIEF DESCRIPTION OF THE DRAWINGS

In the accompanying drawings, which illustrate an exemplary embodiment of the present invention.

DETAILED DESCRIPTION

Figure 1:
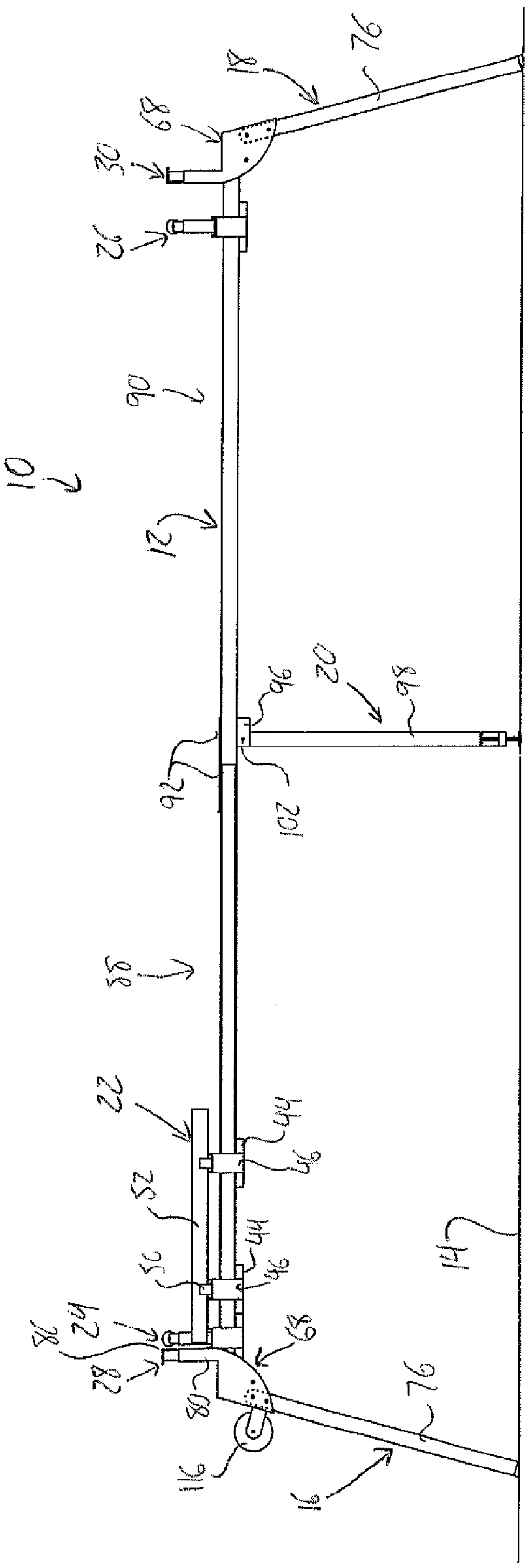
FIG. 1 is a side elevational view of a support stand of the present invention in a working position for movable support of a mitre saw or other power tool.

FIG. 1 shows a side view of a power tool support stand 10 of the present invention in a working position ready for use to movably support a power tool and a workpiece. The stand features a track 12 that is supported at a height above ground level 14 by two end leg assemblies 16, 18 at opposite ends of the track and a middle leg assembly 20 positioned at an intermediate location therebetween. Support on the track 12 in a manner rollable therealong is a tool mount 22 arranged for releasable mounting of a mitre saw or other power tool (not shown) thereon in a position overlying the track 12. Also supported on the track in a manner rollable therealong are two repositionable workpiece supports 24, 26 projecting upward from the track at adjustable positions on opposite sides of the tool mount 22 to support a piece of lumber or other material to be worked by the power tool. Two additional stationary workpiece supports 28, 30 likewise project upward to a height above the track at fixed positions each adjacent a respective end of the track 12.

Figure 2:
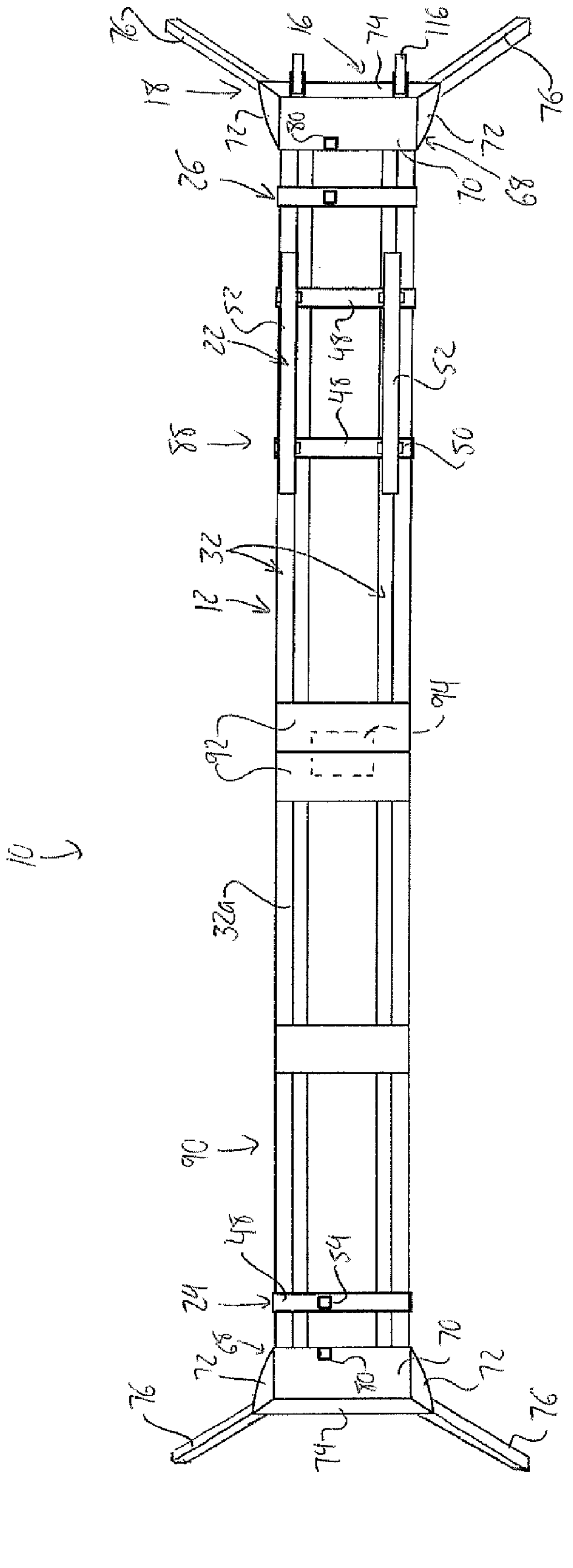
FIG. 2 is a top plan view of the support stand of FIG. 1 with workpiece engagement units removed from uprights of workpiece supports.
Figure 3:
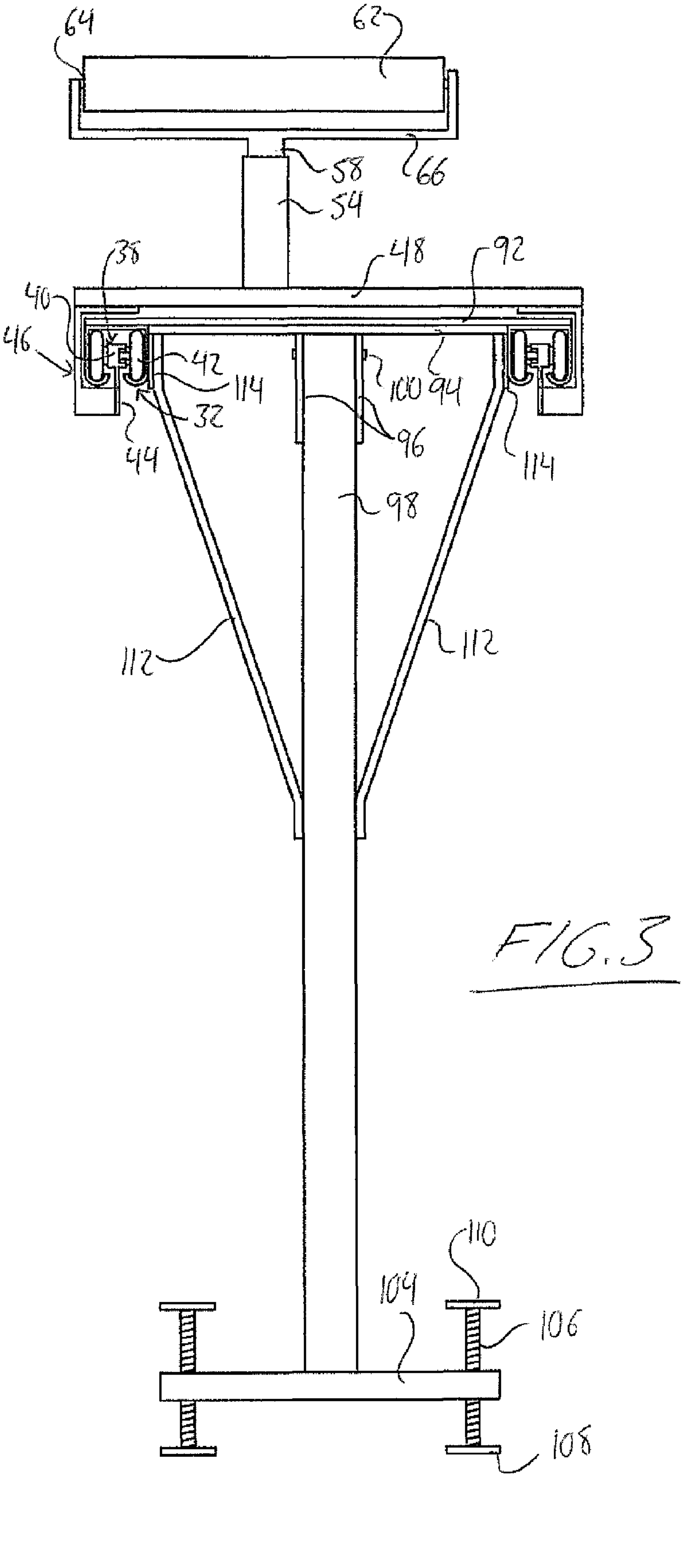
FIG. 3 is an end view of the support stand of FIG. 1 with leg assemblies at the end of the stand omitted for illustrative purposes.
Figure 4:
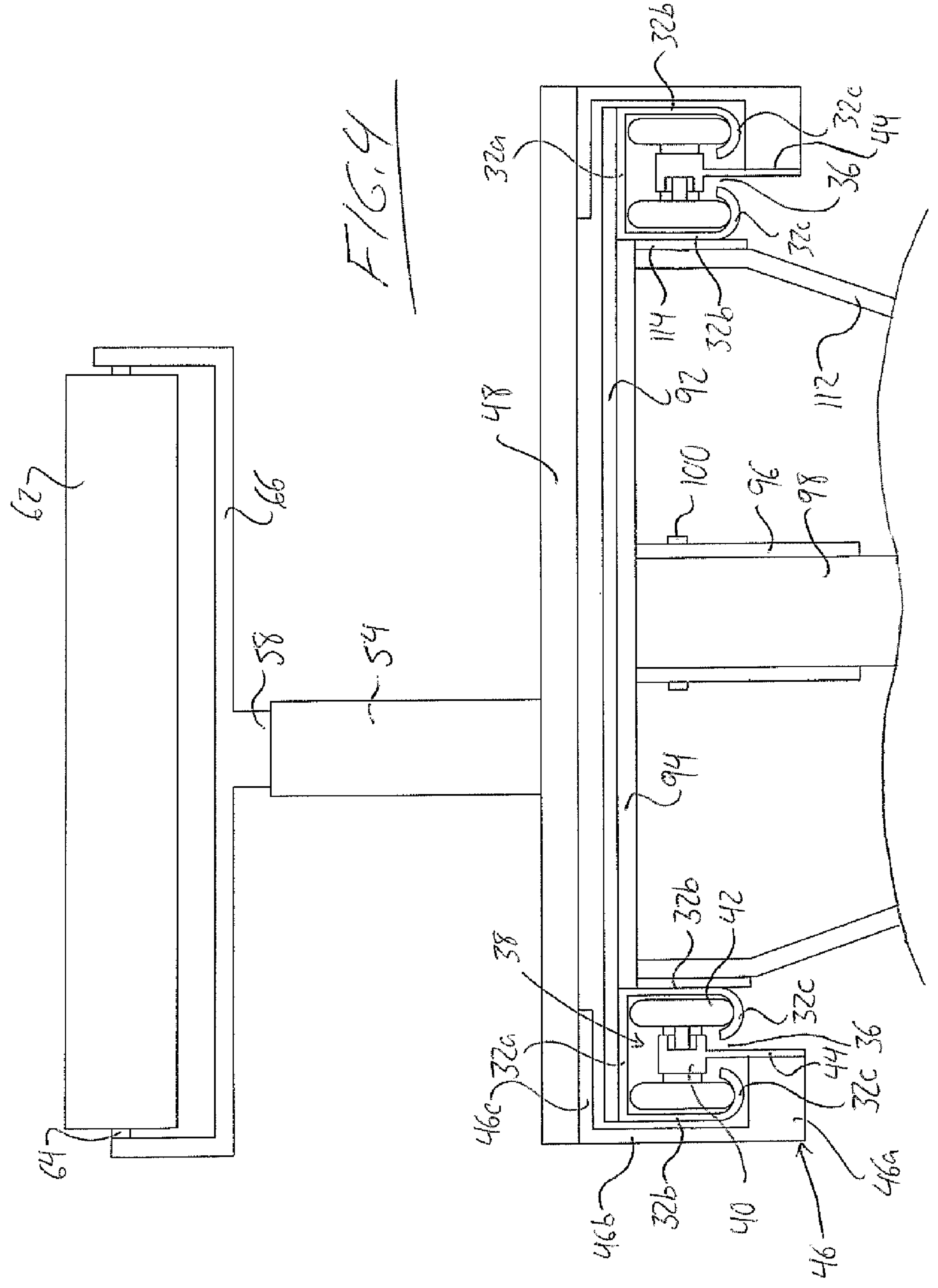
FIG. 4 is an enlarged partial end view of the support stand of FIG. 3.

As shown in FIGS. 2 to 4, the track 12 is comprised of two parallel rails 32 laterally spaced apart from one another in a transverse direction perpendicular to the track length defined by the longitudinal dimension of the equal-length rails 32. With particular reference to FIGS. 3 and 4, each rail 32 has a cross-sectional shape that is fully closed on three of its four sides by a horizontal top or upper wall 32*a* and two opposing sidewalls 32*b* projecting perpendicularly downward from the top wall 32*a* at opposite ends thereof. From each side wall 32*b*, a partial bottom wall 32*c* projects inward therefrom toward the opposite side wall 32*b*, but stopping short of the other partial bottom wall 32*c* so as to leave a gap 36 between the two partial bottom walls 32*c*.

Figure 5:
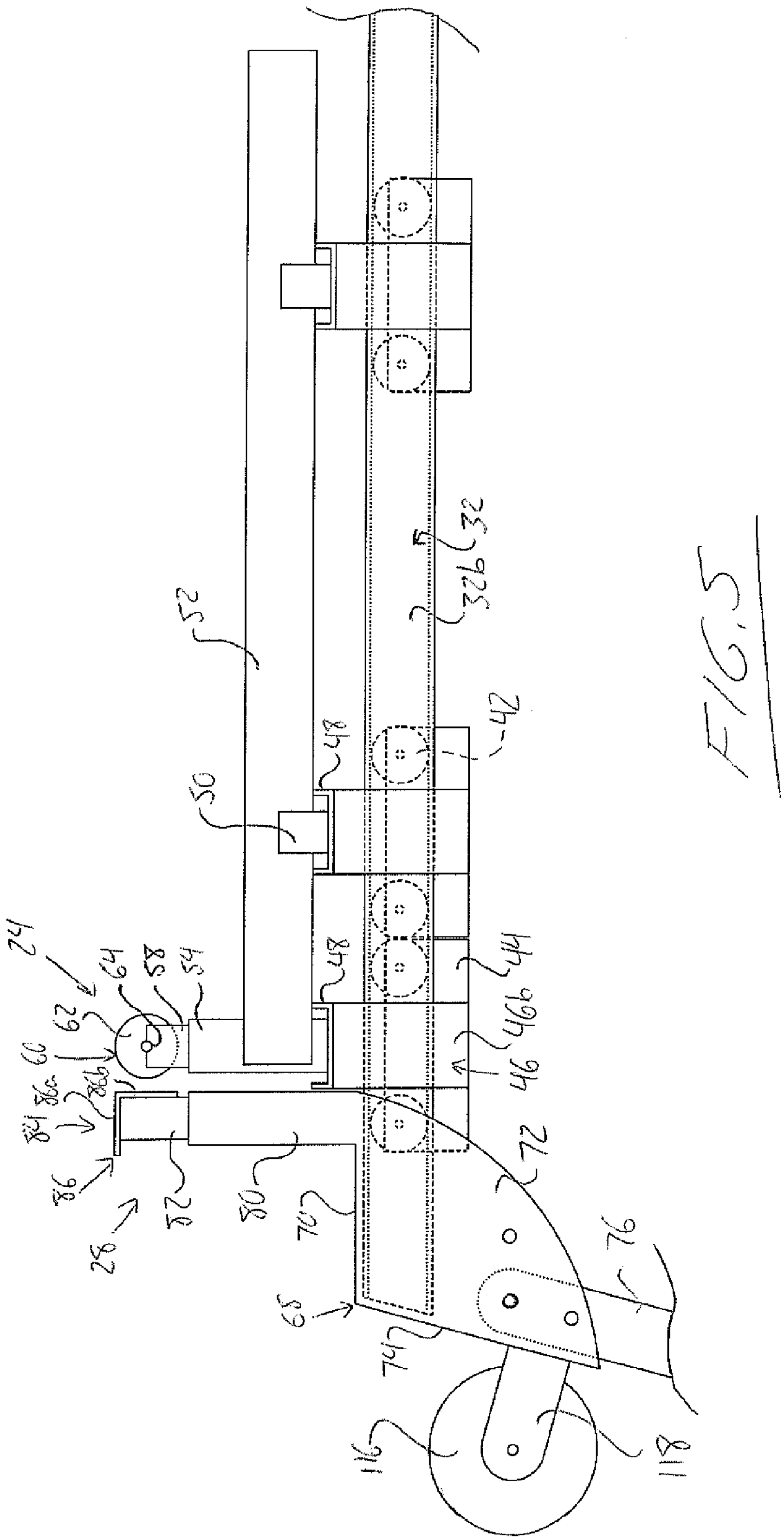
FIG. 5 is an enlarged partial side elevational view of the support stand of FIG. 1.

The tool mount 22 is carried on the track by four roller units, two per rail 32, while each movable workpiece support 24, 26 is carried on the track in the same manner by two roller units, one per rail 32. With reference to FIGS. 4 and 5, each roller unit 38 comprises a carriage 40 to which four wheels or rollers 42 are rotatably coupled in paired arrangements featuring two rollers 42 per side of the carriage 40, each roller 42 sharing the same rotational axis with a respective roller on the opposing side of the carriage 40. The carriage features a plate 44 depending downwardly from its rotational support of the rollers 42 through the gap 38 between the partial bottom walls 32*c* of the respective rail 32. The two rollers 42 on each side of the carriage ride on the upper surface of a respective one of the two partial bottom walls 32*c* of the respective rail 32.

A rectangular C-shaped bracket 46 has a lower horizontal leg 46*a* attached to the depending plate 44 of the carriage 40 below the rail 32, a central vertical leg 46*b* projecting upward from the lower leg 46*a* at the end thereof opposite the carriage plate 44 at a location laterally outward from the rail past the side wail thereof opposite the other rail, and an upper horizontal leg 46*c* projecting inwardly back over the rail 32 at a height above the top wall 32*a* thereof. It is here that the bracket 46 attaches to the remainder of the tool mount 22 or workpiece support 24, 26 that is accordingly rollably supported on the rail 32 by this roller unit 38. The top wall 32*a* of each rail 32 covers the carriage and rollers of each wheel unit riding in that rail, likewise also covering the partial bottom walls 32*c* of the rail on which the wheel units roll. Accordingly, this arrangement of top walls of channel-like rails fully covering the upward facing roller support surfaces of the rail's partial bottom walls over the full length of the rail, and similar closing off of the space between the top and bottom walls from the sides by the sidewalls of the rail, means that sawdust or other airborne material released during use of the power tool on a workpiece above the track will not fall onto the roller supporting surfaces and have a chance to accumulate in a buildup thereon. Accordingly, the track is kept free from any such debris in order to ensure a smooth, trouble free rolling motion of the tool mount and the workpiece supports along the track, avoiding the need to clean the track of any such debris.

In the illustrated embodiment, an upward-opening rectangular U-shaped channel member 48 spans from atop the top leg 46*c* of each rectangular C-shaped channel 46 over one rail to the same position atop a corresponding one of the rectangular C-shaped channels at the other rail 32.

The tool mount 22 is carried by four roller units, two per rail, and thus features two such upward-opening rectangular U-shaped channel members 48 forming cross-members spanning over the track 12 between the brackets of the wheel units on one rail and those of the other rail. An upward-opening U-shaped cradle 50 is fixed to each U-shaped channel member 48 adjacent each end thereof, and has an upward-opening arcuate recess in the top of the cradle that forms its U-shaped appearance in a plane perpendicular to the U-shaped cross-section of the channel member 48. A respective piece of round pipe or tubing 52 running along each rail 32 at a height thereabove is seated in the arcuate recesses of the two cradles 50 residing over that rail on the two U-shaped channel members 48. These tubes 52 define features onto which the base of a mitre saw can be mounted in a known matter using clamping features on the base of the saw (I assume this is how the saw attaches to the tubes. Please confirm or clarify.) It will be appreciated that the structure used to releasable mount a power tool atop the tool mount 22 may be varied, and for example may employ the simple mounting of a flat plate carried atop the wheel unit brackets over the track for clamping or fastening of a power tool to the plate.

Each of the movable workpiece supports 24, 26 is carried by two roller units, one per rail 32, interconnected by a single one of the U-shaped channel members 48 extending perpendicularly across the rails. A vertically oriented piece of rectangular tubing 54 is fixed to the upward facing horizontal center wall of the U-shaped channel member 48 at a position between the two rails 32, thereby forming a hollow upright with an open upper end. A workpiece engagement unit 56 for supporting the underside of a workpiece at a height above the bars 52 of the tool mount 22 features a base 58 of rectangular stock or tubing of smaller cross-sectional size than the hollow interior of the tubular upright 54 so that the bottom end of the base 58 can be inserted into the tubular upright 54 through the open top end thereof for sliding, telescopic receipt of the base within the upright. At or near the top end of the base 58, a workpiece contact member 60 is fixed thereto to lie at least partially above the top end of the base. In the illustrated embodiment, the workpiece contact member 60 shown for each movable workpiece support 24, 26 features a cylindrical roller 62 rotatably carried on a shaft 64 lying perpendicular to the track between upright legs 66 of an upward opening U-shaped bracket 66 fixed atop the base 58.

The telescopic receipt of the base 58 of the workpiece engagement unit in the tubular upright 54 allows for height adjustment of the workpiece contact member, by locking releasably locking the base 58 to the tubular upright 54 at a selected height therealong. This may be accomplished in a conventional manner of by having at least one through hole in the tubular upright or base, each of which is alignable with a select one of a series of spaced apart through holes in the other of the base and the upright so that a pin or other fastening device can be engaged through the aligned holes to maintain the selected vertical position of the base corresponding to the selected pairing of alignable holes. By giving user control over the effective height of each movable workpiece support 24, 26, the height at which a workpiece sits atop one or more of the supports is adjustable in order to compensate for dimensional differences among different saws or tools that may be mounted atop the tool mount 22, as the position of the horizontal working plane of a tool relative to the plane in which the tool is arranged to seat or fasten to the tool mount may vary from one tool to another. The adjustability allows use of different tools on one stand, and selling of a single stand design that is compatible with a variety of tools.

Each of the end leg assemblies 16, 18 features an end cap 68 fitted over the two rails 32 of the track 12 to couple the tracks together at their ends and form suitable features for mounting pivotal legs thereon. The end caps 68 each feature a horizontal top wall 70, two side walls 72 sloping obliquely downward and laterally outward on opposite sides of the track 12, and an end wall 74 sloping obliquely downward and outward past the ends of rails and spanning between the two side walls 72, thereby forming a shroud over the top, end and sides of a respective end of the track 12. A respective pivotal leg 76 is pivotally coupled to each side wall 72 of the end cap 68 on the inside thereof. Each leg 76 is pivotal between a deployed position depending downwardly away from the track 12 along the end wall 74 and side walls 72 of the end cap to the ground 14 below to support the track 12 in an elevated position thereover, and a stowed position lying parallel to the track 12. The illustrated legs each employ a ball detent catch mechanism for securing the leg in either such position. That is, a ball is spring loaded to bias outwardly from the side of the leg facing the respective side wall 72 of the end cap, and two holes in the side wall 72 are of smaller diameter than the ball and positioned to respectively align with the ball when the leg is in the stowed and deployed positions so that the ball engages in the side wall hole to hold the leg in that position. Pressing the ball inwardly back toward the leg releases the leg for pivoting between the two positions.

The stationary workpiece supports 28, 30 feature rectangular tubular uprights 80 the same or similar to those of the movable workpiece supports 24, 26. These uprights 80 are each fixed to the top wall 70 of a respective one of the end caps 68 to project vertically upward therefrom at an inner end of the end cap. In the drawings, these uprights telescopically receive the base 82 of a different type of workpiece engagement unit 84 than the illustrated movable workpiece supports 24, 26. The base 82 has the same rectangular cross section as the base of each movable workpiece support, but instead of a roller carried perpendicular to the base and track and the top end, it carries a right angle channel 86 extending perpendicular to the base and track and its top end. A horizontal leg 86*a* of the right angle channel 86 lies flat atop the base 82 of rectangular tubing or stock, and a vertical leg 86*b* of the right angle channel extends downwardly along the base 82 on a side thereof facing inward to the stationary workpiece support at the other end of the track 12. The stationary workpiece supports are thus telescopically adjustable like the movable workpiece supports. That is, the term stationary refers to the position of the supports along the track, which does not change due to the rigid attachment, of the upright 80 to the end cap 68, whose top wall 70 is fixed atop the rails 32 of the track 12.

With the stationary supports adjusted to position the top surface of the horizontal leg 86*a* of the right angle channel 86 in the same plane as the uppermost point in the circular rotational path of the rollers of the movable workpiece supports 24, 26, a workpiece can lay atop the right angle channel and the roller and be movable thereover in a manner sliding on the top leg of the right angle channel and rolling over the top of the roller. Alternatively, the stationary support can be raised to a higher position in which the vertical leg 86*b* is situated at least partially above the roller of the movable workpiece support to form a stop or blocking surface against which the end of a workpiece can be abutted and held to keep the workpiece in a selected stationary position.

Use of the same contact member base and upright and telescopic cooperation thereof for the movable and stationary workpiece supports means that the workpiece engagement units thereof are interchangeable. That is, the base of any workpiece engagement unit can be withdrawn from the respective upright and exchanged for another. Accordingly, while the drawings show the right angle stop-type workpiece contact member being used at the stationary workpiece supports adjacent the ends of the track, and the rotational roller-type contact member being used at the movable workpiece supports displaceable along the track 12, the workkpiece engagement members may be swapped, removed or moved to achieve various combinations for different workpiece support and/or stop configurations.

In the illustrated embodiment, in addition to use in supporting a workpiece, the tubular upright 80 on each end cap 68 also forms a stop defining an endmost position of the nearest movable workpiece support by blocking moving of the U-shaped channel 48 thereof past the upright. A corresponding endmost position of the tool mount 22 is defined by abutment of the two roller units of the tool mount 22 nearest one end thereof against the two roller units of the movable workpiece support on that side of the tool mount when the movable workpiece support is at its endmost position nearest the respective end of the track 12. The tool mount's position along the track may overlap with that of either movable workpiece support in the illustrated embodiment, where the upright 54 of the movable support can move into the space defined by the two pipes 52 of the tool mount due to the spacing of the connection of each pipe to its roller units at a distance inward from the ends of the pipe.

Mechanisms for locking the tool mount and each movable workpiece support to the track at a selected position therealong may be of known types employed in other sliding or rolling tool mount devices, and thus are not illustrated in the drawings. For example, a threaded hole in the vertical leg of the C-shaped bracket for one or more roller units for each of the tool mount and workpiece supports may receive a threaded-shaft member that is threaded in the opening and has a manually rotatable handle at the outer end so that rotation in a tightening direction engaged the end of the shaft against the outer side wall of the channel to frictionally lock the roller unit to the channel at the current position therealong. (is this correct?)

The illustrated embodiment features a stand formed by the assembly of two separate stand sections 88, 90. Each section features two elongated channel members defining respective lengthwise portions or halves of the rails 32 of the track. An end plate 92 is mounted atop the elongated channel members of the rails 32 of each stand section 88, 90 at inner ends of these elongated channels opposite the outer ends thereof attached to the respective end cap 68. The end plate 92 is coterminous with the inner ends of the elongated channels, so that positioning of the stand sections end-to-end at their inner ends acts to abut edges of the end plates 92 together and abut ends of the channel members of one stand section against the ends of the channel members of the other stand section. This is performed in a manner aligning the channel members of the two sections with one another to form the full length rails of the overall track 12.

The end plates 92 are coupled together to interconnect the two stand sections 88, 90 to form the overall stand described above. In the illustrated embodiment, this is achieved by a connector plate 94 fixed in place beneath one of the two the abutted end plates 92 in a position that aligning through-hole in the connector plate with corresponding through-holes in the other end plate so that threaded fasteners can be engaged through the holes to connect the end plates via the connector plate. As one example, the fasteners may be threaded screws or bolts with wingnuts for manual operation without needs for tools. The height of the brackets 66 carrying the tool mount and movable workpiece supports are sufficient to clear the end plates mounted atop the rails to allow movement of these components from one stand section to the other when connected end-to-end for use. It will be appreciated that other arrangements for realeasably coupling the sections together may alternatively be employed.

To further support the stand when assembled for use, the middle leg assembly 20 is provided on the second stand section 90 near the inner end thereof. Referring to FIGS. 3 and 4, a pair of lug plates 96 depend vertically downward in a spaced apart manner at a central position between the channel members of the rails, for example from the respective one of the end plates 92 at a position outward from where the connector plate is fixed to the underside of the end plate. A single leg 98 is pivotally suspended between the lug plates 96 by a pivot pin 100 passing therethrough. The leg is pivotal between a deployed position projecting vertically downward from the track 12 and a stowed position running parallel thereto between the rails of the track. The leg can use a ball dedent catch mechanism like that described for the end legs 78 to automatically lock in each such position. A catch hole 102 in one of the lug plates 96 for the deployed position is shown in FIG. 1 at a position vertically below the pivot pin 100 for this purpose.

Referring to FIG. 3, a foot plate 104 runs perpendicular to the leg 98 and track 12 at the bottom end of the leg 98, and has a length slightly shorter than the perpendicular distance between the rails 32 so as to fit therebetween when the middle leg 98 is in the stowed position. The length of the leg 98 is selected to intentionally stop short of reaching the ground when the end legs are deployed to support the track 12 over a level horizontal ground surface 14. The foot plate 104 thus resides a short height above the ground when the stand is used over a level area. At each end of the foot plate 104, a threaded shaft 106 engages through a matingly threaded hole extending through the foot plate in a direction parallel to the leg 98. A lower end of the shaft 106 carries a small plate 108 for contacting the ground, and a top end of the shaft carries a handle member 110 for manual rotation of the shaft 106. Rotating the shaft 106 in opposite directions threads it in opposite directions through the foot plate 104 to change the distance by which the shaft projects from the foot plate 104 on the side thereof opposite the leg 98. Accordingly, the effective length of the middle leg assembly 20 can be adjusted so that each ground-contact plate 108 contacts the ground below the middle leg 98 even where the ground is somewhat uneven in the stand's longitudinal track direction between the end legs, and/or the stand's transverse direction perpendicular to the track.

To better prevent twisting or tilting of the track, the illustrated middle leg assembly 20 also features oblique braces 112 each fixed to the middle leg 98 at an intermediate height therealong above the foot plate 104 and each pivotally coupled to an outer lug plate 114 fixed to the inner side wall the channel member of the respective one of the rails 32 at the same pivot axis as the pivot pin 100 of the middle leg 98.

On the first stand section 88, a pair of transport wheels 116 is rotatably carried on the respective end cap for rotation about an axis perpendicular to the track length by wheel support arms 118 projecting outward from the end wall of the cap in directions parallel to the track 12. Thus when the track sections are detached from one another, the first track section can be transported with the legs stowed by rolling the transport wheels along the ground with the rail channel members of the section sloping upwardly away from the ground.

Figure 6:
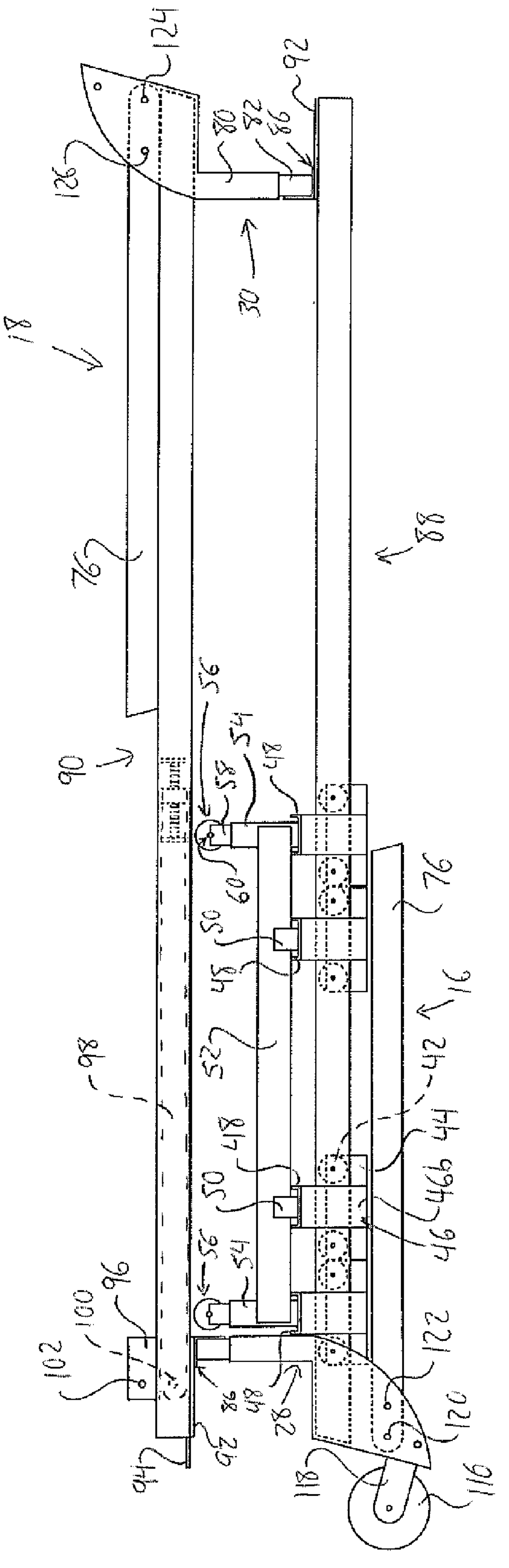
FIG. 6 is a side elevational view of the support stand in a compact position for storage or transport.

Furthermore, the stand is arranged for coupling together of the stand sections 88, 90 in a collapsed or stacked position shown in FIG. 6 for compact storage and transport of the stand sections together as a single unit. To achieve this from the working position shown in the other figures, the tool support 22 and the movable workpiece supports 24, 26 are all moved along the track to their positions nearest the end cap 68 of the first stand section 88, where the wheel units 38 of different movable components abut against one another in the illustrated embodiment as shown in FIG. 6. The legs are moved to their stowed positions two lower the sections of track down to near the ground and the inner ends of the stand sections 88, 90 are disconnected. If not already configured this way, the workpiece engaging units of the workpiece supports are swapped and adjusted as needed in order to place the roller-type units on the movable uprights 54, place the stop-type units on the stationary uprights 80 and set the stop-type units to a height exceeding that of the roller type units.

With the first stand section 80 laid on the ground in the same general orientation as in the working position, i.e. with the first leg assembly 16 below the track 12 and the tool supporting pipes 52 of the movable tool support 22 above the track, the second stand section is vertically inverted to position its end leg assembly 18 above the track 12 and its stationary workpiece mount 30 below the track 12. The second stand section 90 is lifted to a position overlying the first stand section 88 in this vertically-inverted orientation, with the capped outer end of the second section overlying the inner end of the first track section 60 and the inner end of the second track section overlying the capped outer end of the first section.

Still referring to FIG. 6, by having the stop-type workpiece engagement units 84 set further from the rail channel members on their respective stand sections than distances reached from those rail channel members by both the tool mount 22 and the movable workpiece supports 24, 26, lowering of the inverted second stand section 90 onto the first stand section 88 seats the end plate 92 of the second stand section 90 atop the horizontal leg 86*a* of the stationary workpiece support 28 of the first stand section and seats the horizontal leg 86*a* of the stationary workpiece support 30 of the second stand section 90 on the end plate 92 of the first stand section 88. With the two stationary workpiece supports set to the same height, the track sections defined by the rail channel members of the two stand sections lie parallel to one another with enough space between them to accommodate the height of the tool mount 22 and movable workpiece supports 24, 26 on the first track section. With a pairs or set of holes in the right angle channel members of the stationary workpiece supports aligning with a respective pair or set of holes laid out with the same spacing in the end plates 92, the right angle channel members 86 can be fastened to the end plates 92 to secure the two stand sections together, and the resulting assembled unit can be transported by tilting the non-wheeled end (to the right in FIG. 6) up off the ground, and rolling the unit by way of the transport wheels 116 at the opposite end.

Accordingly, the illustrated embodiment employs selectively attachable and detachable stand sections to provide a longer track length when assembled end-to-end for use of the stand, while also providing a space efficient stacked assembly mode useful for efficient transport and storage of the stand when not in use. As shown in FIGS. 1 and 6, the end leg assembly 16 on the first stand section 88 employs a greater distance between its rail channels of the track and the axes of the pivot pin 120 and stowed-position catch hole 122 for each leg than the corresponding spacing from the track of the pivot pin 124 and stowed-position catch hole 126 of the end leg assembly 18 of the second stand section 90. This is so the leg assembly 18 on the second stand section can lie closer to its rail channel members for the most compactness, while the leg assembly 16 of the first stand section 88 leaves a sufficient gap between the rail channel members of the track to accommodate the connection brackets 46 that wrap around the rails to positions therebelow to connect the roller units inside the rails with the movable tool mount and workpiece supports above the track.

An alternative embodiment could connect the roller units to the movable components above the track at a slotted side of the rails while still covering the roller support surfaces from above, thus avoiding the need for a gap between the leg and track when the stand is collapsed, but having the rail channels closed on the top and both sides better avoids exposure of the roller support surfaces to sawdust or other debris. It will be appreciated that the benefits of the covered roller support surface may be exploited in one-piece stand structures where the track does not break down into sections to balance the desire for both maximum track length and portability. Likewise, two-piece stands may benefit from the portability and compactness of the collapsed or stacked condition described herein regardless of whether a movable tool support is arranged for rolling on covered track surfaces. A middle leg assembly may not be required for smaller one-piece stands, or even for two piece stands depending on such conditions as their length and intended load capacity.

While the illustrated channel shape for the rails employs partial bottom walls that curve upward moving toward one another to somewhat embrace about the bottom of a curved wheel/roller profile, flat or curved-profile rollers may instead ride on flat support surfaces. The illustrated embodiment employs two rails, two roller support surfaces per rail, and four wheels per roller unit in a two-per-side configuration for a strong, robust structure capable of supporting notable tool and workpiece loads and providing smooth rolling motion, but other configurations may be employed while still employing a covered track design. Also, connections of the tool mount or workpiece support to the roller units may take place along paths other than around the outside of the rails, as a prototype was produced where rollers were coupled to these components by brackets bending inward then upward from beneath the rails to connect to these components between the rails, and an alternate connection type was employed between stand sections so as not to block motion of such between-rail brackets.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Support stand for rolling support of a power tool, the support stand comprising:

- an elongated track comprising at least one rail and having two opposing ends spaced apart in a longitudinal direction;
- support legs coupled to the track at spaced apart locations along the longitudinal direction for depending downward from the track to a ground surface to support the track at an elevation thereabove;
- a movable tool mount comprising:
  - a tool support positioned above the track and arranged for mounting of the power tool thereon; and
  - rollers positioned below the tool support and carrying the movable tool mount on the track for rolling displacement of the movable tool mount in the longitudinal direction of the track;
- wherein each rail comprises at least one upward facing roller support surface on which at least one of the rollers rides along a length of said roller support surface that is measured between the opposing ends of the elongated track in the longitudinal direction, and a cover arrangement that is positioned above said at least one roller, fully spans across each said roller support surface in a transverse direction perpendicular to the longitudinal direction, and fully spans the length of the roller support surface between the opposing ends of the elongated track, thereby preventing sawdust or other debris from reaching and accumulating on the roller support surface.

2. The support stand of claim 1 wherein each rail comprises a channel member integrally defining the cover arrangement and each of the roller support surfaces of said rail.

3. The support stand of claim 2 wherein said channel member closes fully around three of four sides of said channel member.

4. The support stand of claim 1 wherein the cover arrangement of each rail comprises a top wall closing over said at least one roller and two side walls depending down from said top wall on opposite sides of said at least one roller, and each rail further comprises at least one bottom wall extending from a respective one of the side walls toward the other side wall to define the at least one roller support surface.

5. The support stand of claim 4 wherein said at least one bottom wall comprises two bottom walls extending toward one another from the side walls to define two roller support surfaces, each carrying one or more rollers thereon.

6. The support stand of claim 1 wherein a connection between the tool support and each of the at least one roller of each rail extends into a space between the at least one roller support surface of said rail and the cover arrangement of said rail from below said at least one roller support surface.

7. The support stand of claim 1 wherein the at least one rail comprises two parallel rails spaced apart from another in a width direction transverse to the length of the roller support surfaces, and a connection between the tool support and each of the at least one roller of each of the rails lies as least partially on an outer side of the rail opposite the other rail.

8. The support stand of claim 1 wherein the movable tool mount comprises at least one carriage rotatably carrying at least one pair of the rollers.

9. The support stand of claim 1 wherein the movable tool mount comprises at least one carriage rotatably carrying at least one pair of the rollers on opposite sides of thereof.

10. The support stand of claim 1 wherein the movable tool mount comprises at least one carriage rotatably carrying at least one pair of the rollers at spaced apart locations along the track.

11. The support stand of claim 1 comprising at least one movable workpiece support each movably carried on the track for adjustment of a position of said movable workpiece support in the longitudinal direction of said track.

12. The support stand of claim 11 wherein each of the movable workpiece supports is movable along the track by rolling support of said workpiece support on the same at least one roller support surface on which the movable tool mount is rollingly supported by the rollers.

13. The support stand of claim 11 wherein said at least one movable workpiece support comprises two movable workpiece supports disposed on opposite sides of the movable tool mount in the longitudinal direction of the track.

14. The support stand of claim 11 wherein each movable workpiece support comprises a movable upright unit movably carried on the track in a position projecting upwardly away therefrom, and a plurality of different workpiece engagement units separately deployable in working positions mounted on said movable upright to support a workpiece thereon.

15. The support stand of claim 14 wherein one of the different workpiece engagement units comprises a roller unit arranged to rollingly engage the workpiece above the upright unit when deployed thereon.

16. The support stand of claim 14 wherein each of the workpiece engagement units is removably attachable to the movable upright unit, and is also removably attachable to a stationary upright mounted at a fixed location relative to the longitudinal direction of the elongated track.

17. The support stand of claim 14 wherein each of the workpiece engagement units is arranged for telescopic coupling with the upright unit to enable height adjustment of the movable workpiece support.

18. The support stand of claim 1 wherein the track comprises first and second track sections defined by first and second detachable stand sections arranged for selective attachment to one another in positions aligning ends of the track sections to complete said track, each of the stand sections having a projecting feature thereon projecting upwardly away from the track by a distance exceeding a height by which the movable tool mount movably carried on the first track section reaches thereabove such that detachment of the second stand section from the first stand section, lifting of the second stand section into a position residing over the first stand section in an inverted orientation, and lowering of the inverted second stand section toward the first stand section will seat the second stand section atop the projecting feature of the first stand section and seat the projecting feature of the second stand section on the first stand section to carry the second stand section on the first in a position overlying the movable tool mount carried on the first stand section.

19. Support stand for support of a power tool, the support stand comprising:

first and second stand sections that respectively comprise first and second track sections detachably coupled to one another in a first position placing the first and second track sections end-to-end at inner ends of said track sections to define a track extending in a longitudinal direction between outer ends of the two track sections;

support legs coupled separately to the first and second stand sections at spaced apart locations along the longitudinal direction for depending downwardly from the stand sections to a ground surface to support the track at an elevation thereabove;

a pair of projecting features mounted respectively to the first and second stand sections adjacent the outer ends thereof and each extending a distance away from the track on the side thereof opposite that from which the legs depend when supporting the track above the ground surface; and a movable tool mount comprising a track engaging portion arranged for movement back and forth along the track and a tool support portion carried on the track engaging portion on a side of the track opposite to that from which the legs depend when supporting the track above the ground surface, the tool support portion being arranged for mounting of the power tool thereon;

wherein a length of each track section in the longitudinal direction exceeds a longitudinal distance measured between the projecting features of the first and second stand sections, and the distance reached by each of the projecting features exceeds a height by which the movable tool mount reaches to said side of the track such that detachment of the second stand section from the first stand section, lifting of the second stand section into a position residing over the first stand section in an inverted orientation with the projecting features of the first and second stand sections disposed on opposing sides of the movable tool mount in the longitudinal direction, and lowering of the inverted second stand section toward the first stand section will seat the second stand section atop the projecting feature of the first stand section and seat the projecting feature of the second stand section on the first stand section to carry the second stand section on the first stand section in a position spaced thereabove and directly overlying the movable tool mount and the movable workpiece supports that are carried on the first stand section.

20. The support stand according to claim 19 wherein the support legs comprise pivotal legs coupled to the stand sections for pivoting between stowed positions extending along the track sections and deployed positions projecting away therefrom, each pivotal leg on the first stand section is shorter than each pivotal leg on the second stand section, and a first distance from a first pivotal connection of each pivotal leg on the first stand section to the first track section is greater than a second distance from a second pivotal connection of each pivotal leg on the second stand section to the second track section so as to leave a larger gap between the first track section and each pivotal leg of the first stand section than between the second track section and each pivotal leg of the second stand section when the pivotal legs are in the stowed positions.

* * * * *